United States Patent
Fiorentino et al.

(10) Patent No.: US 8,724,932 B2
(45) Date of Patent: May 13, 2014

(54) FIBER-OPTIC MODULATORS

(75) Inventors: Marco Fiorentino, Mountain View, CA (US); Raymond G. Beausoleil, Redmond, WA (US); David A. Fattal, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 591 days.

(21) Appl. No.: 13/018,301

(22) Filed: Jan. 31, 2011

(65) Prior Publication Data

US 2012/0195543 A1  Aug. 2, 2012

(51) Int. Cl.
*G02B 6/42* (2006.01)
*G02B 6/34* (2006.01)
*G02F 1/01* (2006.01)

(52) U.S. Cl.
USPC ............... 385/1; 385/37; 385/40; 385/123

(58) Field of Classification Search
USPC ............ 385/49–52, 1–10, 31, 37, 39, 40, 41, 385/88–92, 123
See application file for complete search history.

(56) References Cited

U.S. PATENT DOCUMENTS

| | | | |
|---|---|---|---|
| 6,778,313 B2 | 8/2004 | Kambe | |
| 7,031,577 B2 | 4/2006 | Painter et al. | |
| 7,113,336 B2* | 9/2006 | Crosby | 359/485.05 |
| 7,409,327 B2 | 8/2008 | Deliwala | |
| 7,411,715 B2* | 8/2008 | Lazarev et al. | 359/254 |
| 7,542,630 B2 | 6/2009 | Zheng et al. | |
| 7,593,606 B2 | 9/2009 | Fattal et al. | |

* cited by examiner

*Primary Examiner* — Uyen Chau N Le
*Assistant Examiner* — Michael Mooney

(57) ABSTRACT

This disclosure is directed to fiber-optic modulators that can be integrated in optical fibers to encode data in optical signals. In one aspect, a fiber-optic modulator includes a weak planar, sub-wavelength grating disposed between an end of a first optical fiber and an end of a second optical fiber. A first electrode is disposed on an edge of the grating and connected to an electronic signal source, and a second electrode is disposed on the edge of the grating opposite the first electrode and connected to the electronic signal source. The grating includes a grating pattern to reflect a channel input to the first optical fiber when a low or no current portion of an electronic signal to be generated by the electronic signal source is applied to the grating and to transmit the channel when a high current portion of the electronic signal is applied to the grating.

12 Claims, 15 Drawing Sheets

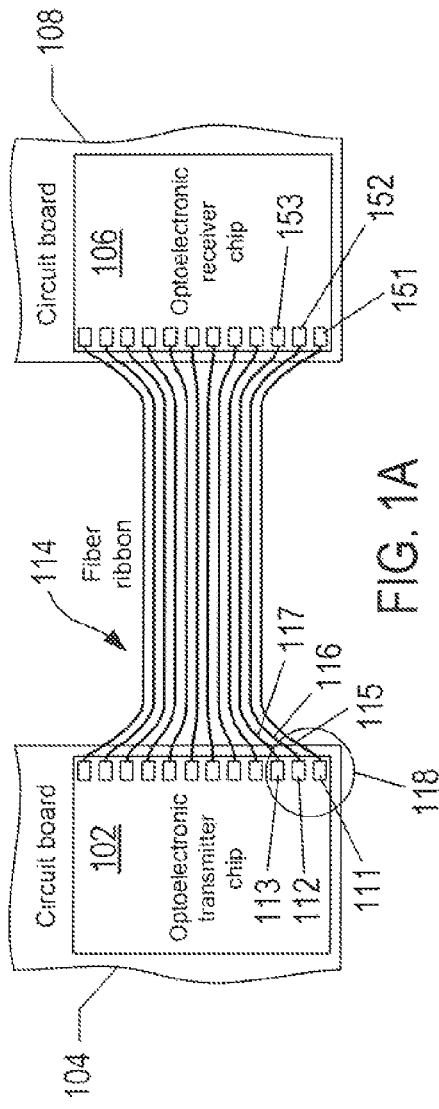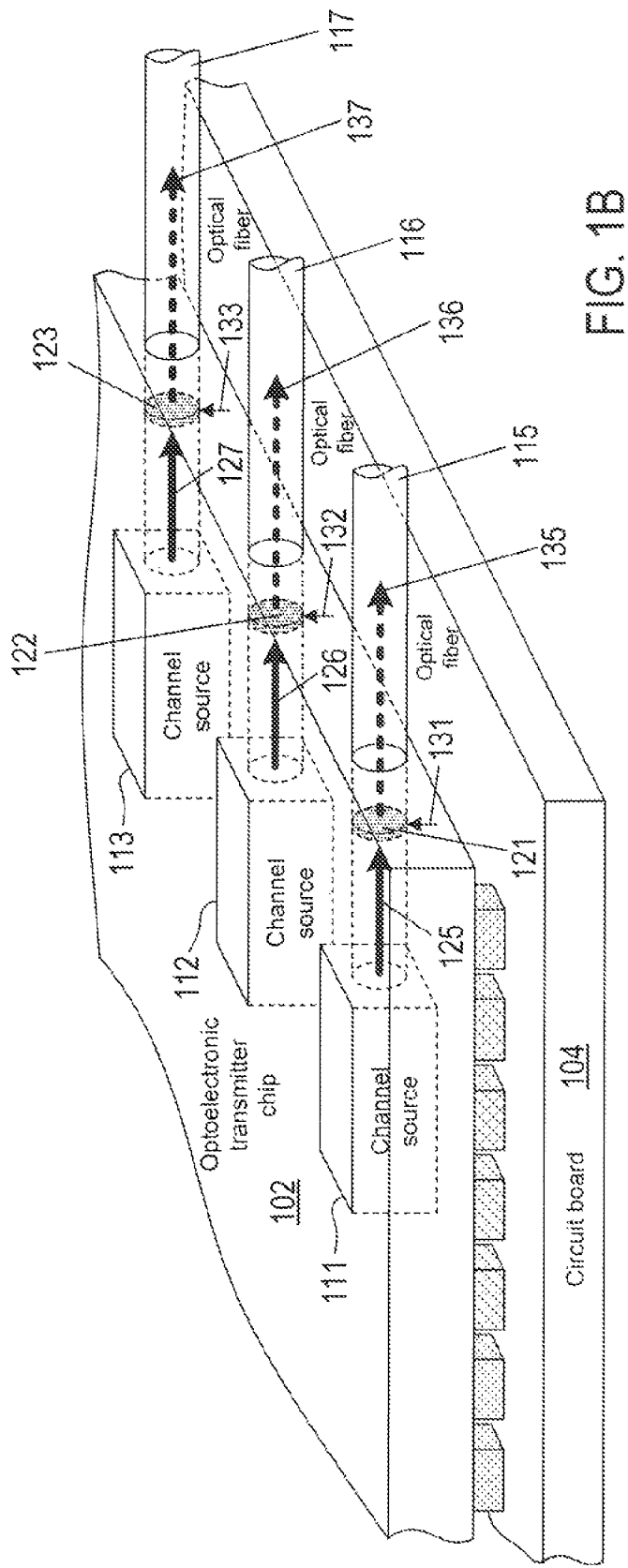

FIBER-OPTIC MODULATORS

TECHNICAL FIELD

The disclosure relates to optical communication systems.

BACKGROUND

In the optical communications space, various techniques are used to generate and send optical signals between communicating devices. An optical signal encodes information in high and low amplitude states or phase changes of a channel of electromagnetic radiation. A "channel" can be a single frequency of electromagnetic radiation or a narrow band of electromagnetic radiation centered about a particular frequency. For example, each high amplitude portion of an optical signal can represent a logic bit value "1" and each low amplitude portion of the same optical signal can represent a logic bit value "0," or vice versa. The optical signal can be transmitted over a waveguide, such as an optical fiber, or though free space.

Optical signals can be generated by either direct modulation or indirect modulation. With direct modulation, an optical signal is generated by modulating the drive current of a channel source, such as a semiconductor laser or a light-emitting diode. Unfortunately, direct modulation of a channel source has a number of drawbacks. One drawback to direct modulation is that the maximum modulation frequency is limited by the nature of the light source, such as laser or light-emitting diode. For example, a typical semiconductor light source cannot be modulated at speeds exceeding 10 Gbps. A second drawback is that direct modulation may shift the output frequency of an optical signal, an effect called "chirp," which increases chromatic dispersion.

Indirect modulation, on the other hand, is performed with two separate components: 1) a channel source that generates an unmodulated channel and 2) a modulator that selectively removes portions of the unmodulated channel to produce an optical signal. Indirect modulation provides an on-off data encoding mechanism and allows both the channel source and the modulator to be fabricated as separate devices with different materials. Indirect modulation typically provides faster modulation rates than direct modulation and does not alter the frequency of the optical signal. Typical high-speed indirect modulators are composed of lithium niobate ("LiNbO$_3$") or a similar material. However, these materials offer a number of drawbacks when integrated with CMOS optoelectronic devices and other optical components. For example, lithium niobate is considerably more expensive than the materials used to fabricate many CMOS devices, and modulators composed of lithium niobate have high packaging cost because lithium niobate components, such as waveguides, cannot seamlessly be integrated with optical fibers.

Designers and manufactures of optoelectronic devices continue to seek faster, lower cost, and more energy-efficient modulators to keep pace with the ever increasing demand for high-speed and high-volume data transmission between optoelectronic devices.

BRIEF DESCRIPTION OF THE DRAWINGS

FIGS. 1A-1C show an example implementation of fiber-optic modulators to send optical signals between chips located on separate circuit boards.

DETAILED DESCRIPTION

This disclosure is directed to fiber-optic modulators that can be integrated in optical fibers to encode data in optical signals. The detailed description of this disclosure is organized as follows. An overview of an example implementation of fiber-optic modulators in optoelectronic devices is provided in a first subsection. Because the fiber-optic modulators disclosed herein are implemented with sub-wavelength gratings ("SWGs"), a general description of SWGs is provided in a second subsection. Descriptions of various examples of fiber-optic modulators integrated in optical fibers are provided in a third subsection.

An Example Implementation of Fiber-Optic Modulators

Figure 1C:
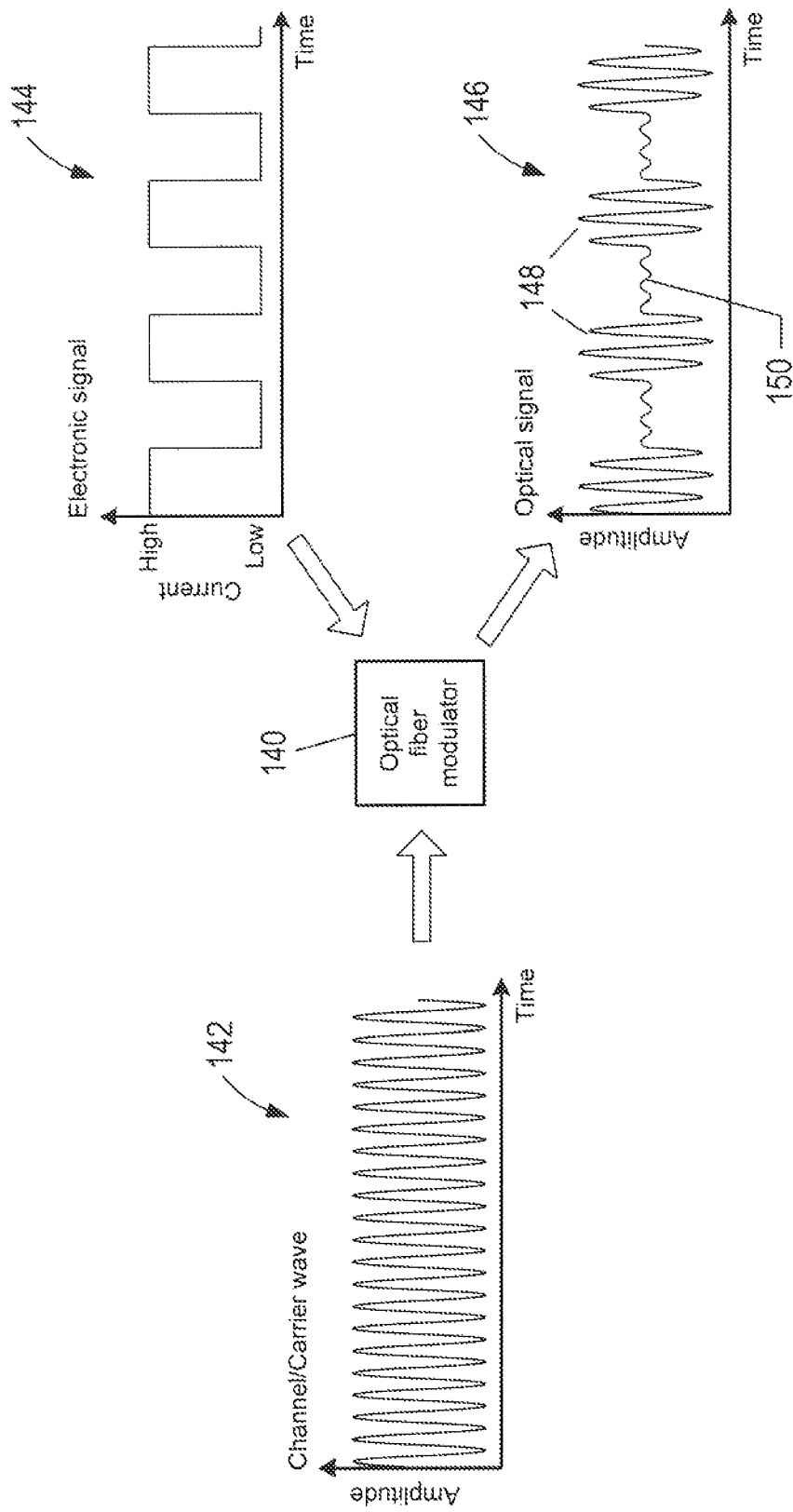

FIGS. 1A-1C show of an example implementation of fiber-optic modulators to send optical signals between chips located on separate circuit boards. FIG. 1A shows a top view schematic representation of an optoelectronic transmitter chip 102 electronically connected to a first circuit board 104 and an optoelectronic receiver chip 106 electronically connected to a second circuit board 108. The transmitter chip 102 includes twelve separate channel sources, such as channel sources 111-113. The transmitter chip 102 can be a device that receives electronic signals from processors, memory, sensors or other electronic devices electronically connected to the board 104. Alternatively, the transmitter chip 102 can be a multicore processor, memory, or a sensor integrated with the channel sources in a single chip. Each source can be a semiconductor laser, such as a vertical-cavity surface-emitting laser ("VCSEL") or an edge-emitting laser, that injects an unmodulated channel into one of twelve single-mode optical fibers bundled into a fiber ribbon 114. The twelve sources can be configured to generate the same channel, or the sources can each be configured to generate one of twelve different channels. Each optical fiber is integrated with a fiber-optic modulator (not shown) that is electronically connected to, and independently operated by, the transmitter chip 102. The transmitter chip 102 operates the fiber-optic modulators to encode data in optical signals that are sent over the optical fibers to twelve corresponding photodetectors of the receiver chip 106.

FIG. 1B shows a magnified isometric view of a portion 118 of the transmitter chip 102 that includes channel sources 111-113. Single-mode optical fibers 115-117 are connected to the sources 111-113, respectively. Fiber-optic modulators 121-123 are electronically connected to the transmitter chip 102 and are integrated in the optical fibers 115-117, respectively. The sources 111-113 inject unmodulated channels 125-127 into the corresponding optical fibers 115-117. The modulators 121-123 receive electronic signals 131-133 and the channels 125-127, respectively, and output optical signals 135-137 into the fibers 115-117, respectively. The optical signals 135-137 encode the same data as the electronic signals 131-133, respectively.

FIG. 1C shows an example representation of a fiber-optic modulator 140 receiving an unmodulated channel, represented by amplitude versus time plot 142, and an electronic signal, represented by current versus time plot 144. In example plot 144, the electronic signal is composed of alternating high and low currents levels, where a low current level can represent logic bit value "0" and a high current level can represent logic bit value "1;" or vice versa. The modulator 140 simultaneously receives the unmodulated channel and the electronic signal to produce an optical signal represented in plot 146, which is a series of alternating high and low amplitude pulses that correspond to the high and low current levels of the electronic signal. In particular, high amplitude pulses 148 of the optical signal are produced when the modulator 140 receives a high current level and low or essentially no amplitude pulses 150 are produced when the modulator 140 receives a low current level. Note that the pulses 148 are merely representative of the pulses typically comprising an optical signal. In practice, a single pulse of an optical signal may be composed of thousands or millions of optical cycles.

Returning to the example of FIG. 1A, the optical signals are transmitted over the optical fibers 114 to the photodetectors of the receiver chip 106. The photodetectors can be p-i-n junction photodiodes or avalanche photodiodes that each covert a corresponding optical signal into an electronic signal for processing devices attached to the board 108. For example, the optical signals 135-137, represented in FIG. 1B, are transmitted via optical fibers 115-117 to photodetectors 151-153, respectively, which convert the optical signals back into electronic signals for processing.

Sub-Wavelength Gratings

Figure 2:
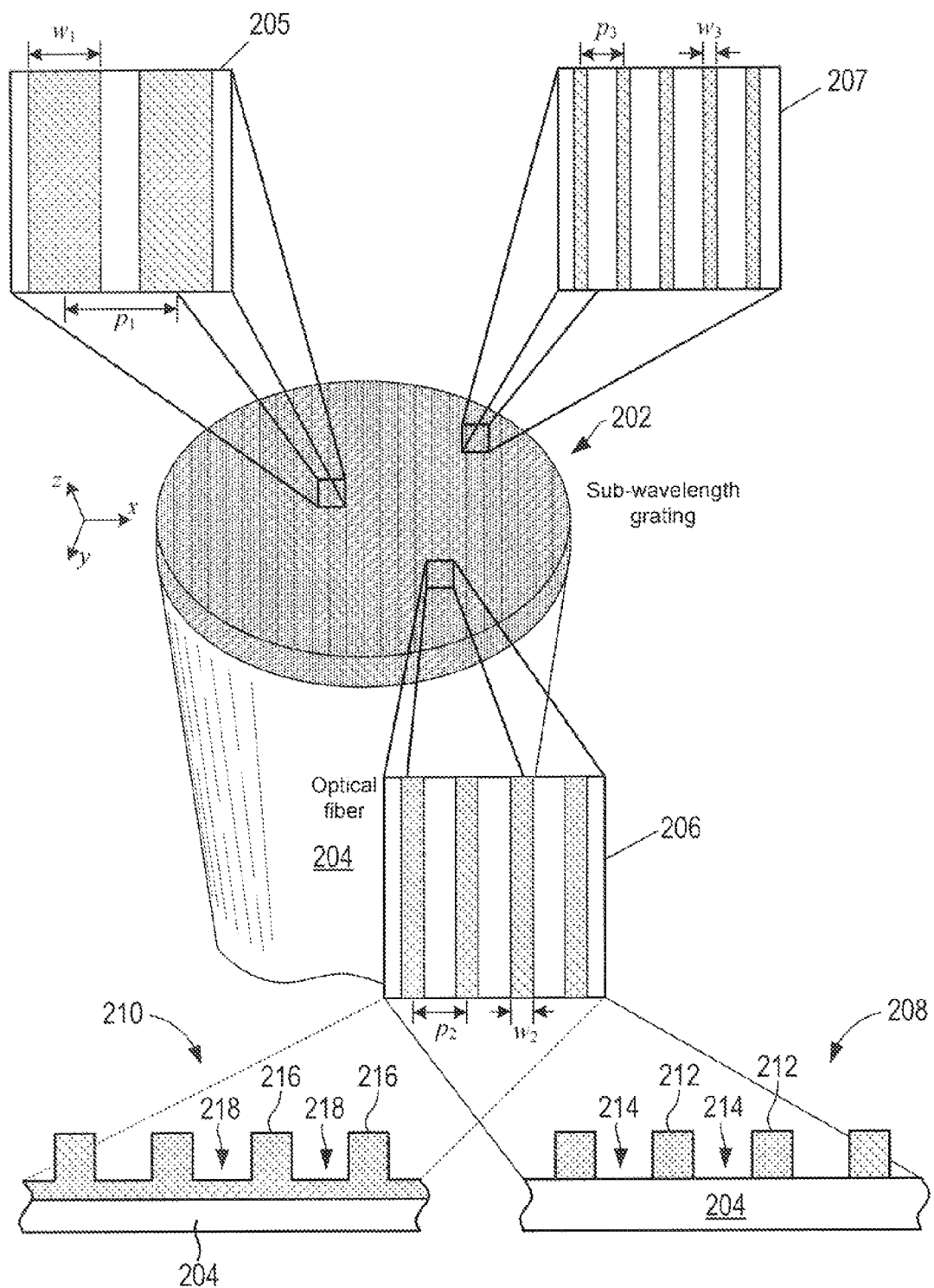
FIG. 2 shows an isometric view of an example planar, sub-wavelength, grating disposed on an end surface of an optical fiber.

FIG. 2 shows an isometric view of an example planar, sub-wavelength, grating ("SWG") 202 disposed on an end surface of an optical fiber 204. The SWG 202 is composed of a relatively higher refractive index material than the core and cladding of the fiber 204. For example, the SWG 202 can be composed of a material such as silicon ("Si") or gallium arsenide ("GaAs") and the fiber 204 can be composed of silica glass. The SWG 202 can be configured with a particular grating pattern that enables the SWG 202 to be operated in the same manner as a float, spherical, or cylindrical mirror.

FIG. 2 shows three example magnified regions 205-207 of the SWG 202. Each region comprises a number of regularly spaced wire-like portions of the SWG 202 material called "lines" separated by grooves. The SWG 202 can be referred to as a one-dimensional SWG, because the lines and grooves extend in the y-direction and are spaced in the x-direction. FIG. 2 also includes two magnified end-on views 208 and 210 of the region 206, which represent two different types of SWGs. End-on view 208 represents a "strong" SWG, and end-on view 210 represents a "weak" SWG. A strong SWG has a relatively high contrast between the refractive index of the lines and the refractive index of the substrate. For example, in end-on view 208, cross-sections of the lines 212 are composed of a relatively higher refractive index material than the fiber 204 and can be formed by etching grooves 214 that expose portions of the fiber 204. On the other hand, a weak SWG has a relatively low or no contrast between the refractive index of the lines and the refractive index of the substrate. For example, in end-on view 210, the lines 218 and grooves 218 are formed by shallow etching a material disposed on the end of the fiber 204. The grooves 218 do not expose the fiber 204 beneath.

The SWG 202 is referred to as a sub-wavelength grating because the period of the lines, p, and the line width, w, are less than the wavelength of the light $\lambda$ for which the SWG 202 is configured to interact. For example, the lines widths can range from approximately 10 nm to approximately 300 nm and the periods can range from approximately 20 nm to approximately 1 µm depending on the wavelength of the incident light. The light reflected from a region acquires a phase $\phi$ determined by the line thickness t and the duty cycle $\eta=w/p$ in the region. In the example of FIG. 2, the regions 205-207 each have a different period and line width in the x-direction. For example, the region 201 comprises lines of width $w_1$ separated by a period $p_1$, the region 202 comprises lines with width $w_2$ separated by a period $p_2$, and the region 203 comprises lines with width $w_3$ separated by a perk:id $p_3$, where $p_1>p_2>p_3$ and $w_1>w_2>w_3$. In this case, the SWG 202 is referred to as an "non-periodic" SWG. On the other hand, When the SWG 202 is configured with the same period spacing (e.g., $p_1=p_2=p_3$) and the same line widths (e.g., $w_1=w_2=w_3$) throughout, the SWG 202 is referred to as a "periodic" SWG. Light reflected from anywhere on a periodic SWG 202 acquires the same phase shift.

Light incident on the one-dimensional SWG 202 can be decomposed into a TM-polarization component and a TE-polarization component. TE polarization refers to light polarized with the electric field component directed parallel to the lines of the SWG 202, and TM polarization refers to light polarized with the electric field component directed perpendicular to the lines of the SWG 202. One-dimensional SWGs can be configured to interact differently with TM and TE polarized light. For example, a one-dimensional SWG with a particular duty cycle, line thickness, and index of refraction reflects TM-polarized light of a particular wavelength with high reflectivity while transmitting TE-polarized light with the same wavelength. Changes in the duty cycle, line thickness, and index of refraction cause the SWG to interact differently with TM-polarized light. For example, two one-dimensional SWGs with the same duty cycle and line thicknesses, but with different refractive indices, interact differently with TM-polarized light of the same wavelength. The SWG with the higher index of refraction may reflect the TM-polarized light with a phase shift $\phi$, but the SWG with the lower index of refraction may transmit the TM-polarized light or reflect the TM-polarized light with a different phase shift $\phi'$, where $\phi \neq \phi'$.

One-dimensional, periodic SWGs do not control the direction or shape of reflected or transmitted TM-polarized light, but one-dimensional, non-periodic SWGs can be configured with a grating pattern to reflect or transmit light with a particular direction and wavefront shape. Two examples of one-dimensional, non-periodic SWG patterns are now described with reference to FIGS. 3A-3B. For the sake of brevity, only two SWG patterns are described. These two SWG patterns are not intended to be exhaustive of the nearly limitless different non-periodic grating patterns that can be used to control the direction and shape of reflected and transmitted wavefronts.

Figure 3A:
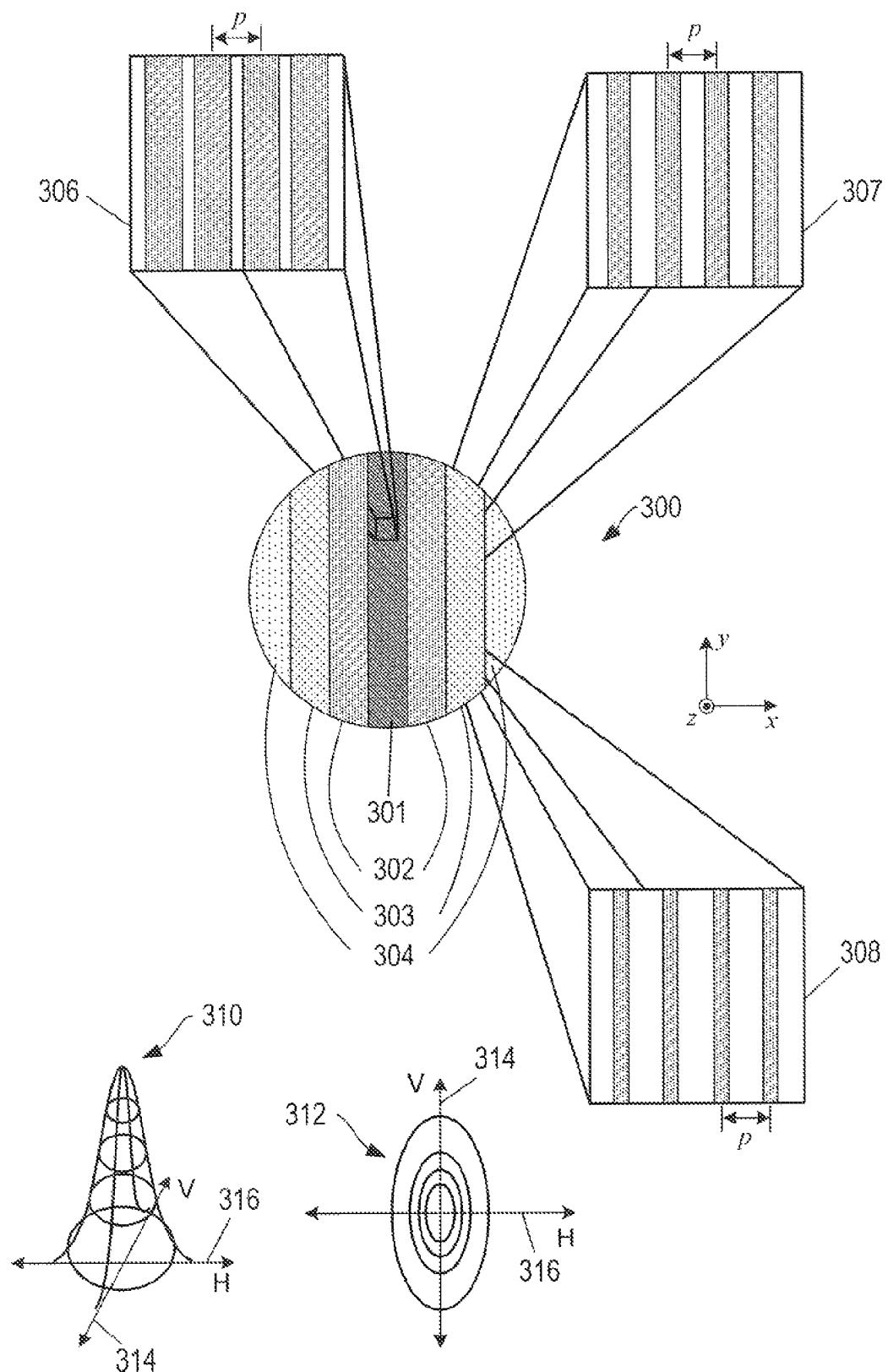
FIGS. 3A-3B show top plan views of two examples of one-dimensional sub-wavelength gratings.

FIG. 3A shows a top plan view of an example non-periodic SWG 300 configured to operate as a focusing cylindrical mirror for incident TM polarized light. The grating pattern of the SWG 300 is represented by shaded regions 301-304, each region represents lines extending in the y-direction with a particular duty cycle. For example, darker shaded regions represent regions with a relatively larger duty cycle than lighter shaded regions. FIG. 3A also includes magnified views 306-308 of sub-regions revealing that the lines are parallel in the y-direction and the duty cycle it decreases away from the center of the SWG 300. The SWG 300 is configured to operate as a cylindrical mirror by focusing reflected TM polarized light to a focal point. FIG. 3A also includes example isometric and top view contour plots 310 and 312 of reflected beam profiles at the foci. V-axis 314 is parallel to the y-direction and represents the vertical component of a reflected beam, and H-axis 316 is parallel to the x-direction and represents the horizontal component of the reflected beam. The reflected beam profiles 310 and 312 indicate that for incident TM polarized light, the SWG 300 reflects a Gaussian-shaped beam that is narrow in the direction perpendicular to the lines (the "H" or x-direction) and broad in the direction parallel to the lines (the "V" or y-direction).

Figure 3B:
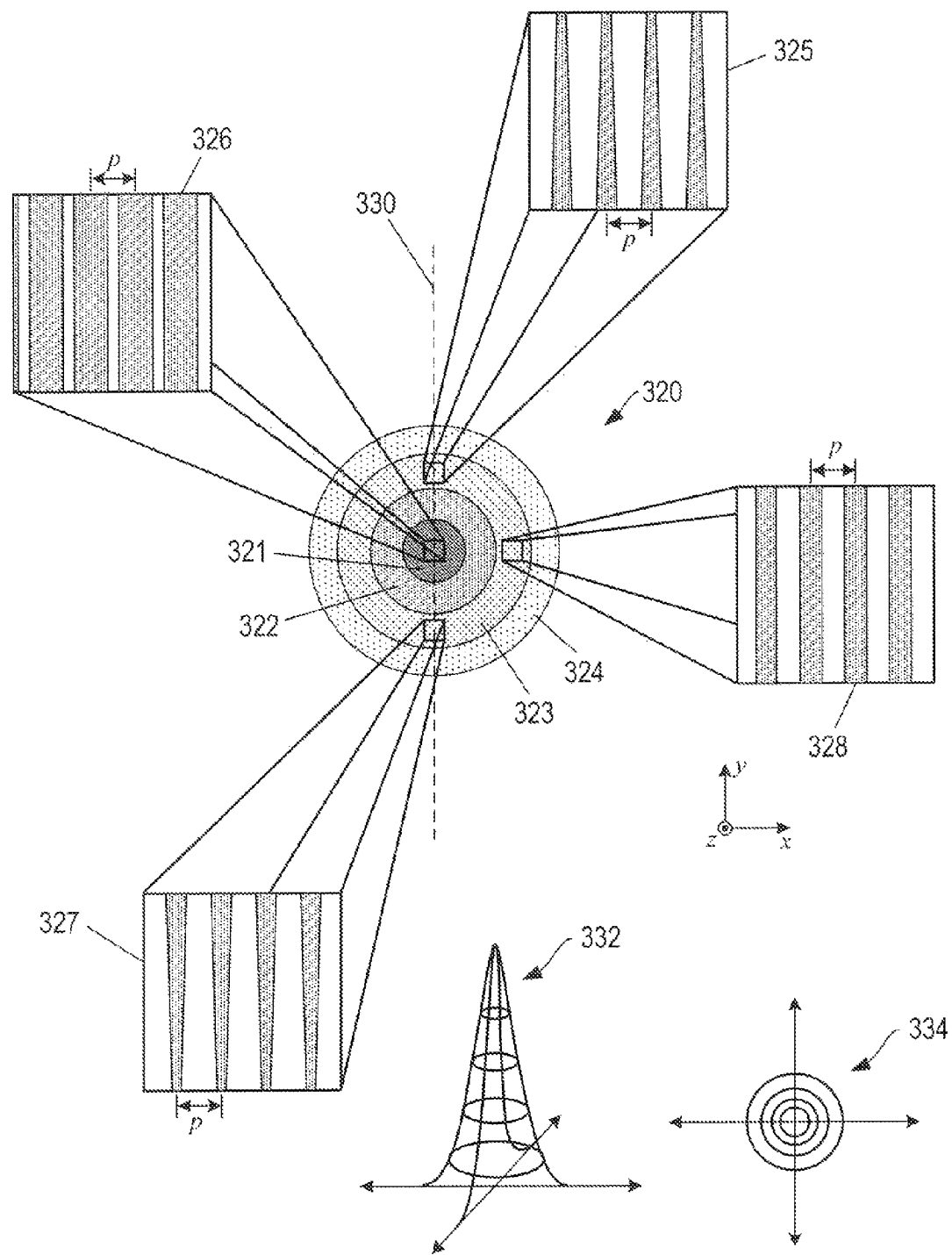

FIG. 3B shows a top plan view of an example SWG 320 configured to operate as a focusing spherical mirror for incident TM polarized light. The SWG 320 is represented by annular shaded regions 321-324 that define a circular mirror aperture. Magnified views 325-328 reveal that the lines are tapered in the y-direction with a constant line period spacing p in the x-direction. In particular, magnified views 325-327 show portions of the same set of lines extending in the y-direction along dashed-reference line 330. Each annular region has the same duty cycle η throughout the annular region. As a result, each portion of an annular region imparts the same approximate phase shift to the light reflected. For example, light reflected from anywhere within the annular region 323 acquires substantially the same phase shift. FIG. 3B also includes example isometric and top view contour plots 332 and 334 of reflected beam profiles at the foci of the SWG 320. The beam profiles 332 and 334 reveal that the SWG 320 produces a symmetrical Gaussian-shaped reflected beam.

Two-dimensional SWGs are composed of post or holes formed in high refractive index material disposed on an end of an optical fiber. Unlike one-dimensional SWGs, two-dimensional SWGs are insensitive to the polarization of the incident light and can be configured with periodic and non-periodic grating patterns. Two-dimensional, periodic SWGs do not control the shape of the reflected wavefront or angle of reflection. On the other hand, two-dimensional non-periodic SWGs can be configured with grating patterns to control the shape of the reflected wavefront or angle of reflection.

Figure 4A:
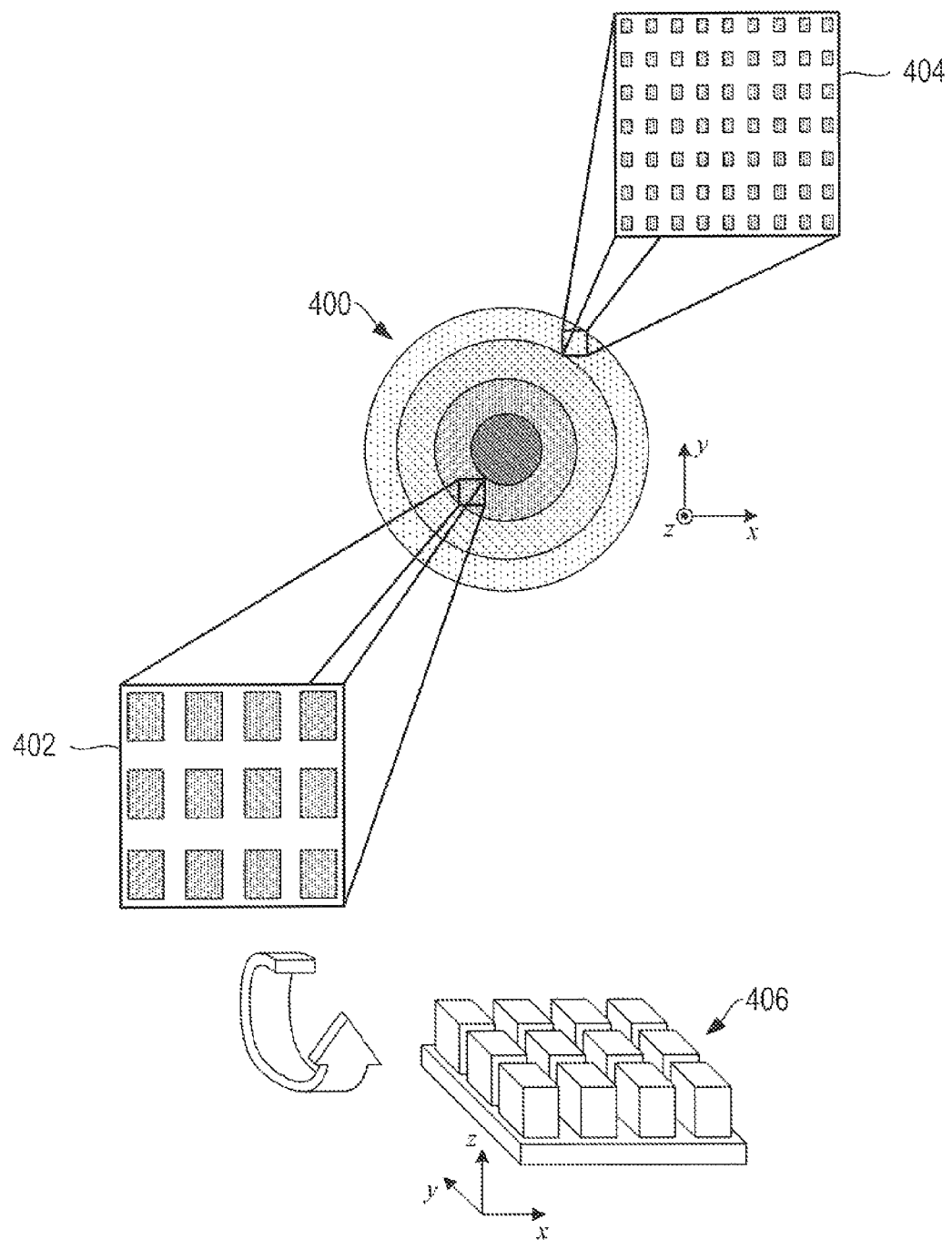
FIGS. 4A-4B show top plan views of two examples of two-dimensional sub-wavelength gratings.
Figure 4B:
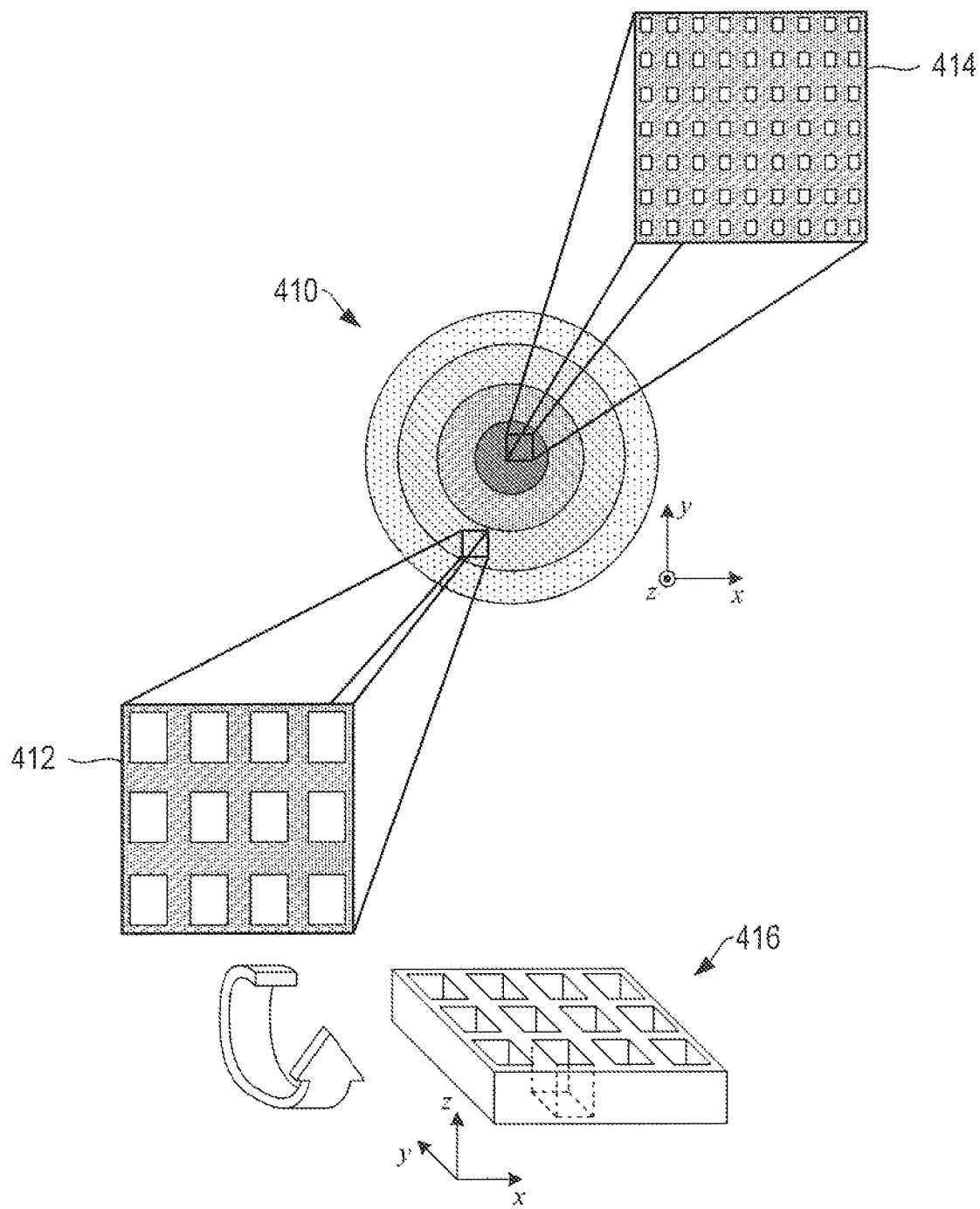

FIGS. 4A-4B show examples of two-dimensional, non-periodic SWGs configured to operate as converging spherical mirrors for reflected beams or light. In FIG. 4A, an example two-dimensional SWG 400 is composed of rectangular-shaped posts separated by grooves. The duty cycle and period can be varied in the x- and y-directions. Magnified top views 402 and 404 show rectangular posts with two different sizes. FIG. 4A includes an isometric view 406 of the posts in Magnified view 402. Alternatively, the posts can be square, circular, elliptical or any other suitable shape. In FIG. 4B, an example two-dimensional SWG 410 is composed of rectangular-shaped holes in a high refractive index material. Magnified views 412 and 414 show two different sized for rectangular-shaped holes. The duty cycle can be varied in the x- and y-directions. FIG. 4B includes an isometric view 416 of the magnified view 412. Alternatively, the holes can be square, circular, elliptical or any other suitable shape.

Unlike two-dimensional non-periodic SWGs, two-dimensional periodic SWGs are composed of square or circular shaped posts or holes, but with approximately the same duty-cycle and thickness throughout and simply operate as flat reflective mirrors for particular wavelengths of light.

Techniques for designing and fabricating one- and two-dimensional SWGs are described in Hewlett-Packard U.S. Patent Application No. PCT/US/2009/051026, filed Jul. 17, 2009, and in "Flat Dielectric Grating Reflectors with High Focusing Power," by D. Fattal et al., *Nature Photonics*, 4, 466-470, May 2010, which are herein incorporated by reference.

Fiber-Optic Modulators

Figure 5A:
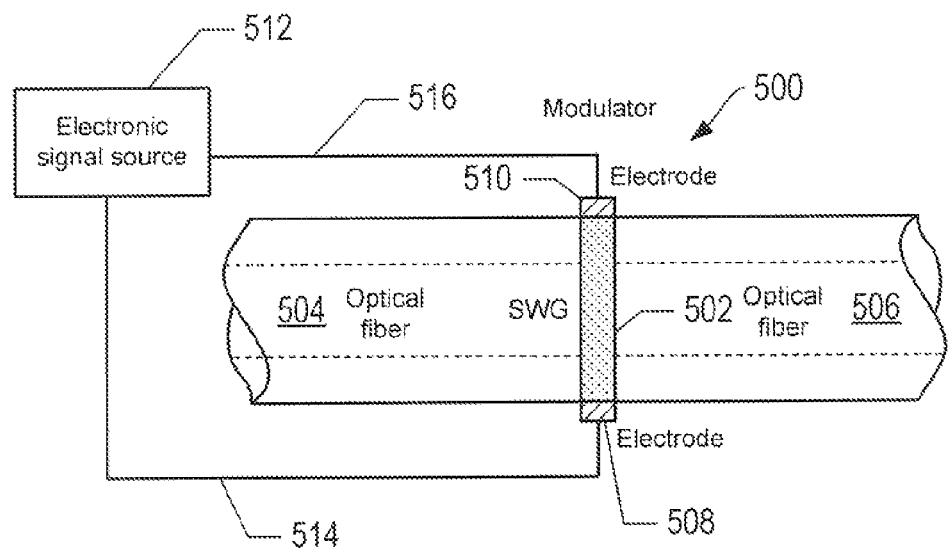
FIGS. 5A-5C show a schematic representation and an isometric view, respectively, of an example fiber-optic modulator integrated in an optical fiber.
Figure 5B:
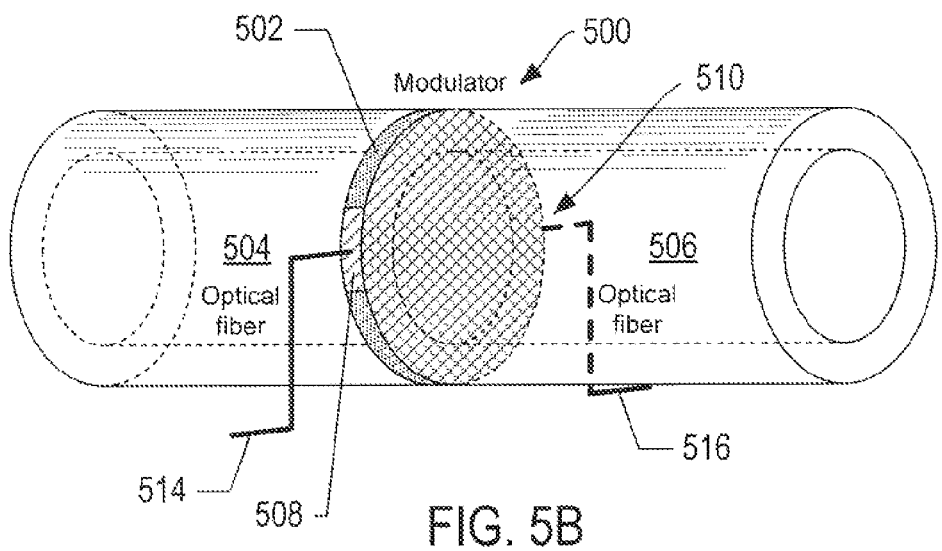

FIGS. 5A-5B shows a schematic representation and an isometric view, respectively, of an example fiber-optic modulator 500 integrated in an optical fiber. The modulator 500 includes a SWG 502 disposed between an end of a first optical fiber 504 and an end of a second optical fiber 506. The modulator 500 also includes a first electrode 508 attached to an edge of the SWG 502 and a second electrode 510 attached to the edge of the SWG 502 with the second electrode 510 located opposite the first electrode 508. In FIG. 5A, the electrodes 508 and 510 are attached to an electronic signal source 512 via electronic signal lines 514 and 516. The signal source 512 can be an optoelectronic transmitter chip, a processor, memory, a sensor, or any other electronic signal generating device. The modulator 500 can be integrated within an optical fiber by severing the optical fiber into the first optical fiber 504 and the second optical fiber 506. The SWG 502 is formed on the end of the first optical fiber 504 and united with the end of the second optical fiber 506.

Figure 5C:
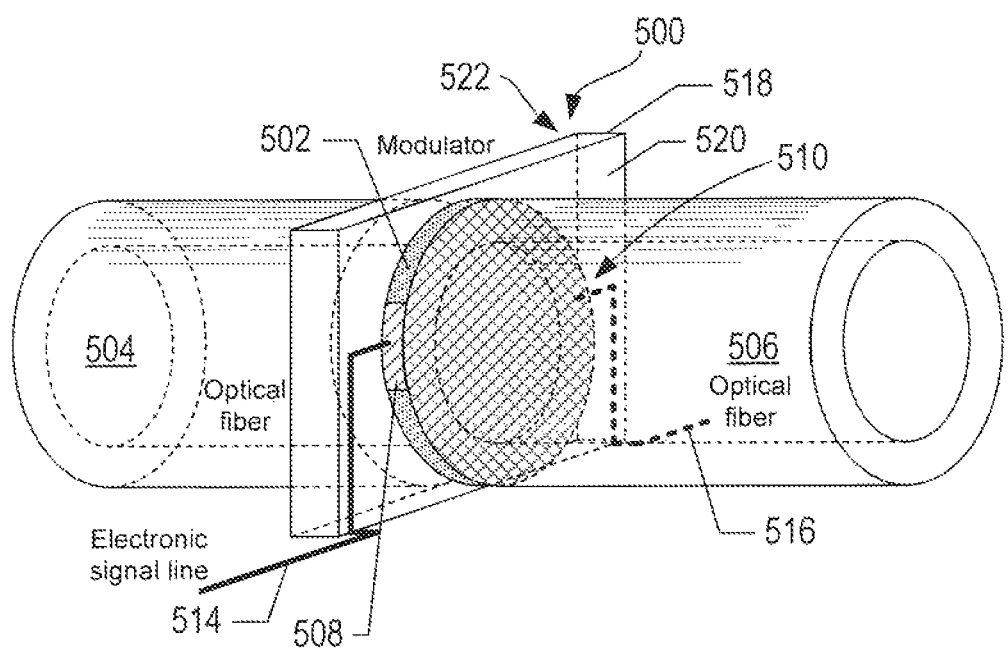

FIG. 5C shows an isometric view of the example fiber-optic modulator 500 mounted on a transparent plate 518 composed of silica glass or a transparent polymer. The plate 518 has opposing first and second surfaces 520 and 522. The SWG 502 and electronic signal lines 514 and 516 are disposed on the first surface 520. The end of the first optical fiber 504 is united with the second surface 522 opposite the SWG 502, and the end of the second optical fiber 506 is united with the SWG 502.

The SWG 502 can be formed in a single elemental semiconductor, such as Si and germanium ("Ge"), or a compound semiconductor, such as III-V compound semiconductor, where Roman numerals III and V represent elements in the IIIa and Va columns of the Periodic Table of the Elements. Compound semiconductors can be composed of column IIIa elements, such as aluminum ("Al"), gallium ("Ga"), and indium ("In"), in combination with column Va elements, such as nitrogen ("N"), phosphorus ("P"), arsenic ("As"), and antimony ("Sb"). Compound semiconductors can also be further classified according to the relative quantities of III and V elements. For example, binary semiconductor compounds include semiconductors with empirical formulas GaAs, InP, InAs, and GaP; ternary compound semiconductors include semiconductors with empirical formula $GaAs_yP_{1-y}$, where y ranges from greater than 0 to less than 1; and quaternary compound semiconductors include semiconductors with empirical formula $In_xGa_{1-x}As_yP_{1-y}$, where both x and y independently range from greater than 0 to less than 1. Other types of suitable compound semiconductors include II-VI materials, where II and VI represent elements in the IIb and VIa columns of the periodic table. For example, CdSe, ZnSe, ZnS, and ZnO are empirical formulas of exemplary binary II-VI compound semiconductors.

The electrode 506 can be a p-type semiconductor, and the electrode 508 can be an n-type semiconductor. The p-type electrode 506, n-type electrode 508 and intrinsic SWG 502 form a p-i-n junction. P-type and n-type semiconductors are formed by implanting p-type and n-type impurities into an intrinsic semiconductor. P-type impurities can be atoms that introduce vacant electronic energy levels called "holes" to the electronic band gaps of the SWG 502. These impurities are also called "electron acceptors." N-type impurities can be atoms that introduce filled electronic energy levels to the electronic band gap of the SWG 502. These impurities are called "electron donors." For example, boron ("B"), Al, and Ga are p-type impurities that introduce vacant electronic energy levels near the valence band of Si; and P, As, and Sb are n-type impurities that introduce filled electronic energy levels near the conduction band of Si. In III-V compound semiconductors, column VI impurities substitute for column V sites in the lattice and serve as n-type impurities, and column II impurities substitute for column III atoms in the III-V lattice to form p-type impurities.

Alternatively, the electrodes 508 and 510 can be composed of a conductor, such as copper, aluminum, gold, silver, or platinum.

Figure 6A:
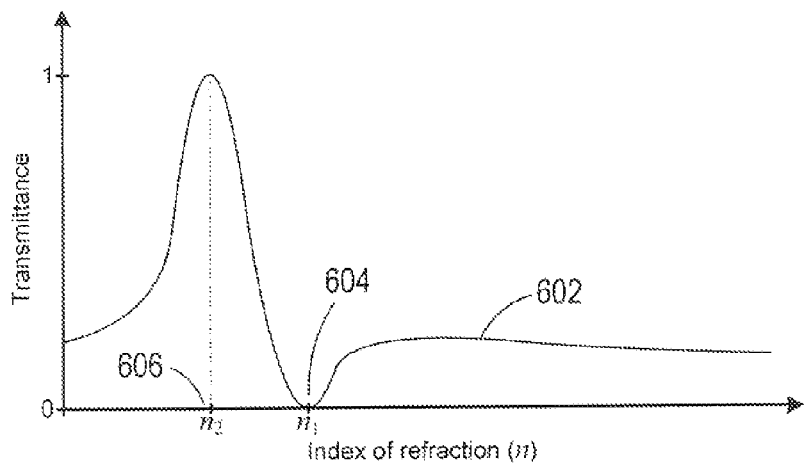
FIGS. 6A-6C show an example of a fiber-optic modulator operated to modulate a channel injected into an optical fiber.
Figure 6B:
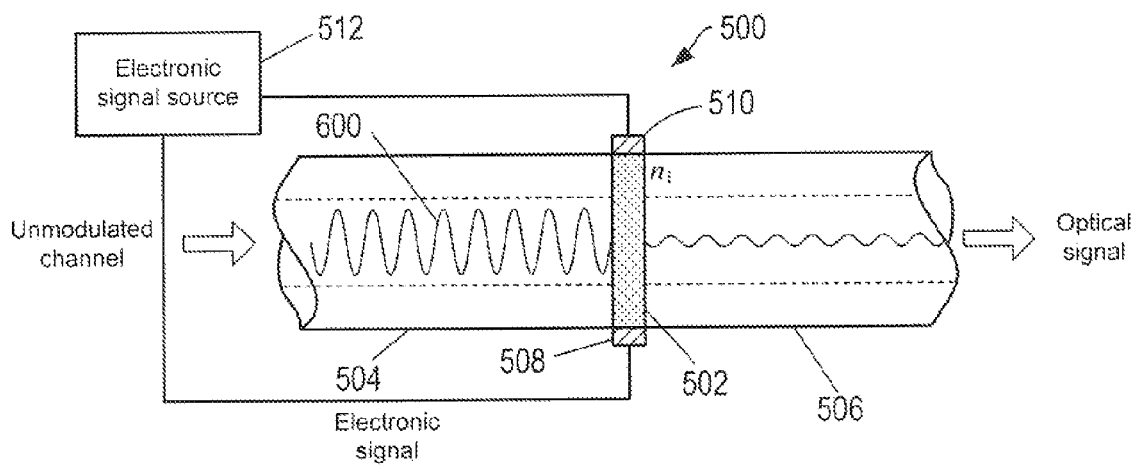
Figure 6C:
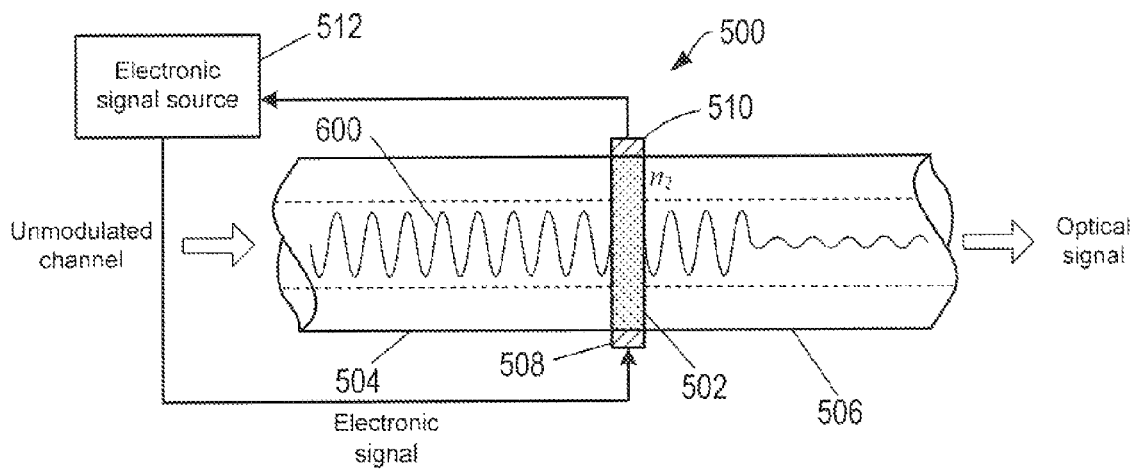

In order to use the modulator 500 to generate an optical signal, the SWG 502 is configured as a weak SWG, as described above with reference to FIG. 2. FIGS. 6A-6C show an example of the modulator 500 operated to modulate a channel 600 injected into the optical fiber 504. The channel 600 can be generated by a semiconductor laser (not shown), such as a VCSEL or an edge-emitting laser, connected to an opposite end of the first optical fiber 504. FIG. 6A shows a plot of transmittance versus index of refraction for the weak SWG 502. Curve 602 represents the transmittance of the weak SWG 502 for the channel 600 over a continuum of refractive indices. In FIG. 6A, two effective refractive indices $n_1$ 604 and $n_2$ 606 are identified. The SWG 502 is configured with a grating pattern so that when the SWG 502 has the effective refractive index $n_1$, the SWG 502 effectively operates like a mirror to reflect the channel 600 back into the optical fiber 504, which corresponds to the SWG 502 having a transmittance of approximately "0." On the other hand, when an appropriate amount of current is injected into the SWG 502, the effective refractive index of the SWG 502 switches to $n_2$ and the SWG 502 transmits the channel 600 with a transmittance of approximately "1."

The modulator 500 can be used to generate an optical signal as follows. The modulator 500 receives an electronic signal generated by the electronic signal source 512. The electronic signal is composed of a pattern of high and low current levels, as described above with reference to the example electronic signal in FIG. 1C. FIG. 6B shows the modulator 500 when the electronic signal source 512 produces a low or no current level associated with the electronic signal. When the current level is low or near "0," effectively no bias is applied to the modulator 500 and the effective refractive index of the SWG 502 is $n_1$. As a result, the SWG 502 substantially blocks the transmission of the channel 600. On the other hand, FIG. 6C shows the modulator 500 when the electronic signal source 512 produces a high current level associated with the electronic signal. When the current level is high, an appropriate forward bias is applied to the modulator 500. The forward bias injects charge carriers into the SWG 502 and switches the effective refractive index of the SWG 502 from $n_1$ to $n_2$. As a result, the SWG 502 transmits the channel 600. When the electronic signal transitions from a high current level to a low or no current level, a short duration reverse bias can be applied to the modulator 500 in order to quickly sweep out the charge carriers and switch the effective refractive index of the SWG 502 from $n_2$ to $n_1$.

In summary, the modulator 500 receives an electronic signal composed of a pattern of high and low current levels that switch the effective refractive index of the SWG 502 between refractive indices $n_2$ and $n_1$ producing an amplitude modulated optical signal composed of a pattern of optical pulses, where a high amplitude pulse corresponds to a high current level and no pulse or a low amplitude pulse corresponds to a low current level.

The weak SWG 502 can be configured with a one- or a two-dimensional grating pattern, as described above in the preceding subsection. When the SWG 502 is configured with a one-dimensional grating pattern, the channel 600 is TM polarized. On the other hand, when the SWG 502 is configured with a two-dimensional grating pattern, the SWG 502 is polarization insensitive and the channel 600 can be polarized in any direction or the channel 600 can be unpolarized.

Figure 7A:
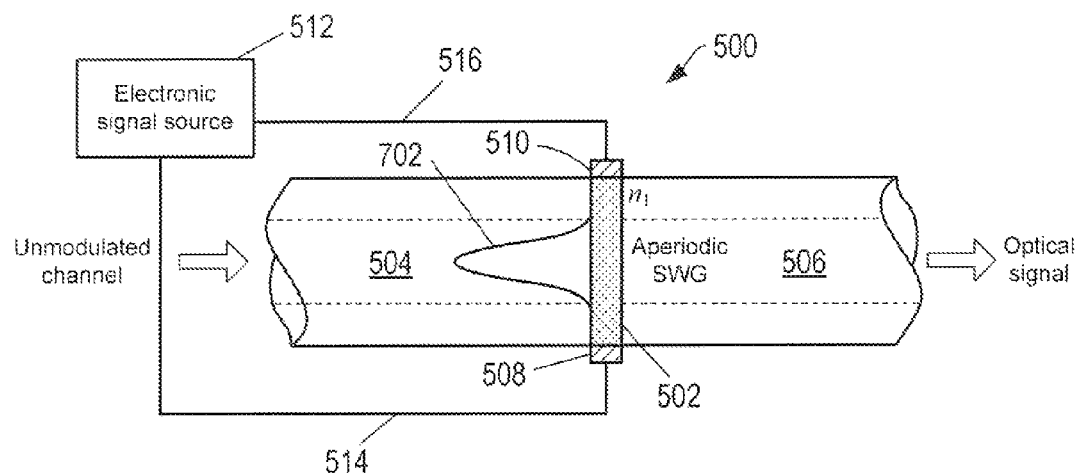
FIGS. 7A-7B show example Gaussian-shaped beam profiles for light reflected back and light transmitted into the core of an optical fiber.
Figure 7B:
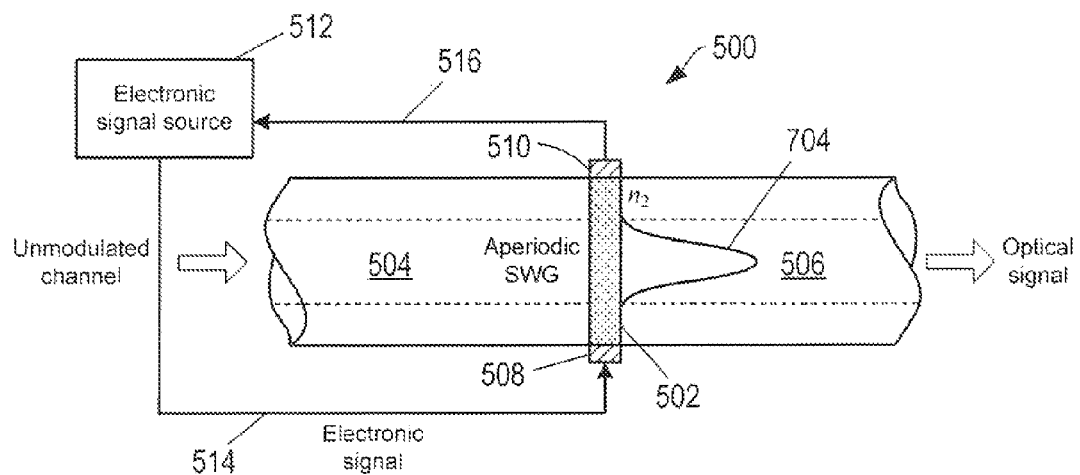

The SWG 502 can be configured with a periodic or an non-periodic SWG, as described above in the preceding subsection. When the SWG 502 is configured with a periodic grating pattern, the SWG 502 does not alter the wavefront shapes of the reflected and transmitted channel 600. On the other hand, the SWG 502 can be configured with an non-periodic grating pattern that focuses the reflected or transmitted channel b 600. FIG. 7A shows an example Gaussian-shaped beam profile 702 for the light reflected back into the core of the optical fiber 504 when a low or no current is applied to the SWG 502. FIG. 7B shows an example Gaussian-shaped beam profile 704 for the light transmitted through the SWG 502 and into the core of the optical fiber 506 when a high current is applied to the SWG 502. The reflected and transmitted Gaussian-shaped profiles 702 and 704 are produced when the SWG 502 is configured to operate as a cylindrical or a spherical mirror, as described above with reference to FIGS. 3 and 4.

Figure 8A:
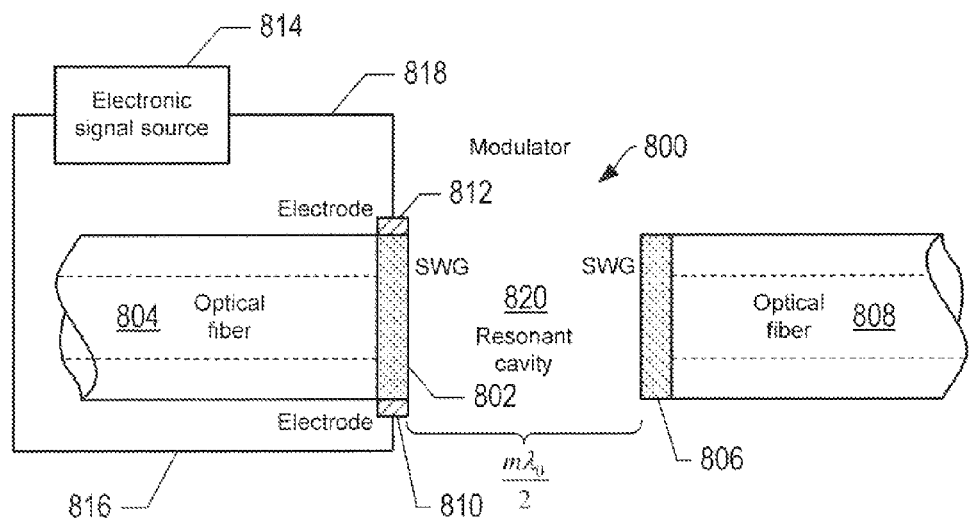
FIGS. 8A-8D show a schematic representation and an isometric view, respectively, of an example fiber-optic modulator integrated in an optical fiber.
Figure 8B:
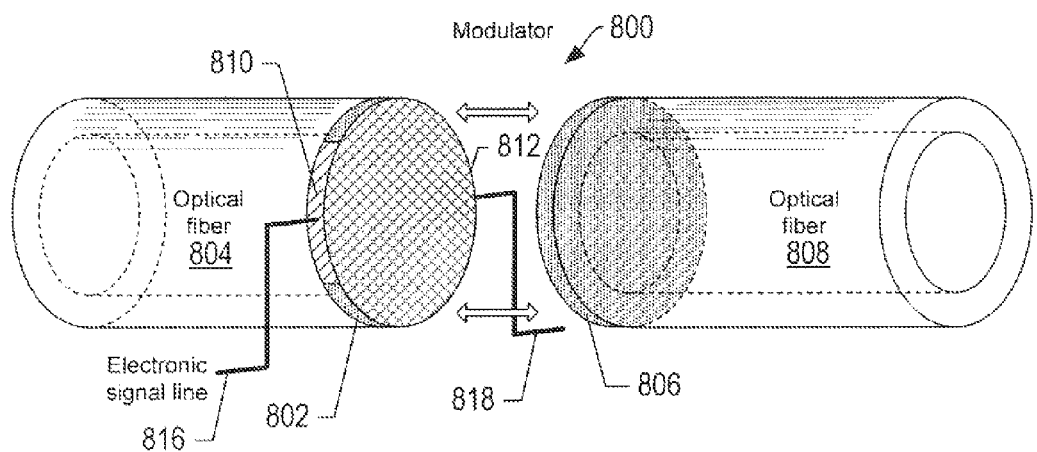

FIGS. 8A-8B show a schematic representation and an isometric view respectively, of an example fiber-optic modulator 800 integrated in an optical fiber. The modulator 800 includes a first SWG 802 disposed on an end of a first optical fiber 804 and a second SWG 806 disposed on an end of a second optical fiber 808. The modulator 800 also includes first and second electrodes 810 and 812 attached to an edge of the second SWG 806 with the second electrode 812 located opposite the first electrode 810. In FIG. 8A, the electrodes 810 and 812 are connected to an electronic signal source 814 via electronic signal lines 816 and 818. The signal source 814 can be an optoelectronic transmitter chip, a processor, memory, a sensor, or any other electronic signal generating device. The modulator 800 can be integrated within an optical fiber by severing the optical fiber into the first optical fiber 804 and the second optical fiber 808. The SWG 802 is formed on the end of the first optical fiber 804, and the SWG 806 is formed on the end of the second optical fiber 808. The SWGs 802 and 806 are positioned approximately parallel to one another and separated to form a resonant cavity 820 with longitudinal separation $m\lambda_0/2$, where m is a positive integer referred to as the longitudinal mode or mode, and $\lambda_0$ is the free-space wavelength of the channel input to the cavity 820.

Figure 8C:
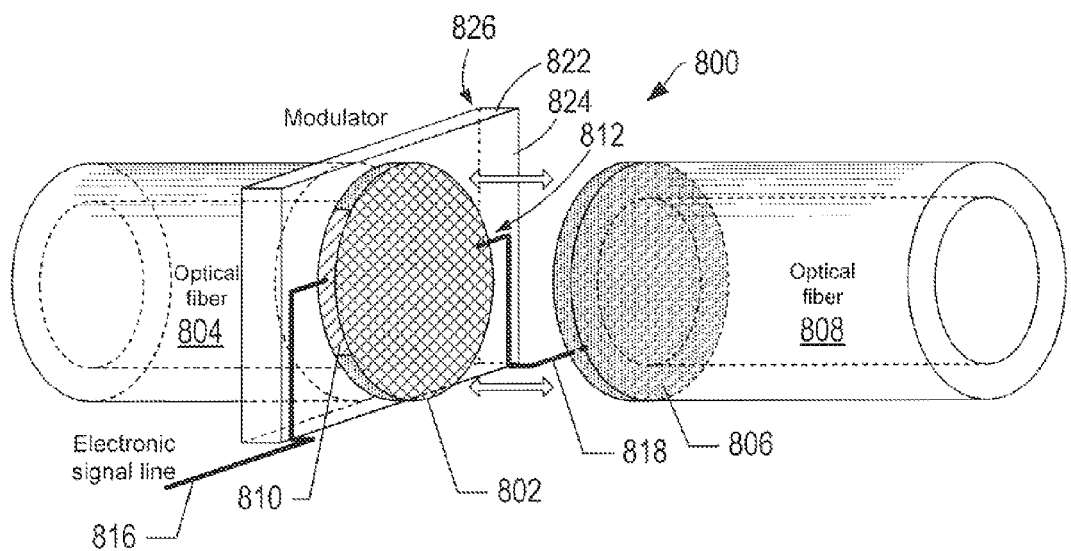

FIG. 8C shows an isometric view of the example fiber-optic modulator 800 with the first SWG 802 mounted on a transparent plate 822 composed of silica glass or a transparent polymer. The plate 822 has substantially parallel opposing first and second surfaces 824 and 826. The SWG 802 and electronic signal lines 816 and 818 are disposed on the first surface 824. The end of the first optical fiber 804 is united with the second surface 826 opposite the SWG 802.

Figure 8D:
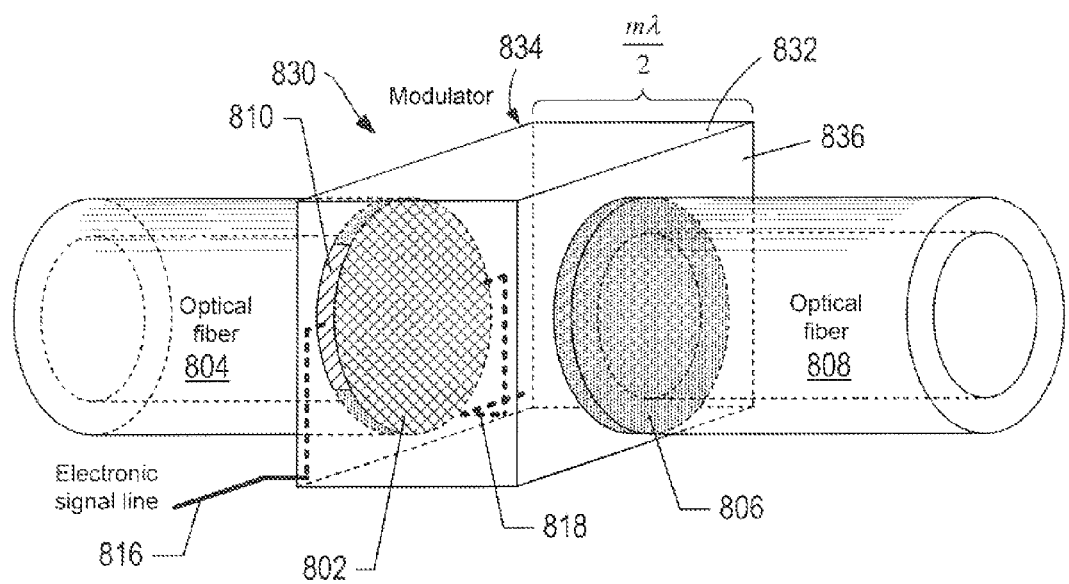

The example fiber-optic modulator 800 has a free-space resonant cavity 820. Alternatively, the resonant cavity of a fiber-optic modulator can be filled with a transparent material in the form of a transparent block, cylinder, or segment of an optical fiber of an appropriate length. FIG. 8D shows an isometric view of an example fiber-optic modulator 830. The modulator 830 is similar to the modulator 800 except the resonant cavity 820 is filled with a transparent material represented by transparent block 832. The block 832 has substantially parallel opposing first and second surfaces 834 and 836. The SWG 802 and electronic signal lines 816 and 818 are disposed on the first surface 834, and the end of the first optical fiber 804 is united with the SWG 802. The SWG 806 is disposed between the second surface 836 and the end of the second optical fiber 808. In order to form a resonant cavity between the SWGs 802 and 806, the length of the block 832 between the SWGs 802 and 806 is where $m\lambda/2$, where $\lambda=\lambda_0/n_b$ and $n_b$ is the refractive index of the block 832.

The SWGs 802 and 806 are configured as strong SWGs and can be composed of an intrinsic semiconductor and the electrodes 810 and 812 can be composed of p-type and n-type semiconductors, as described above. Alternatively, the electrodes 810 and 812 can be composed of a conductor, such as copper, aluminum, gold, silver, or platinum.

Figure 9A:
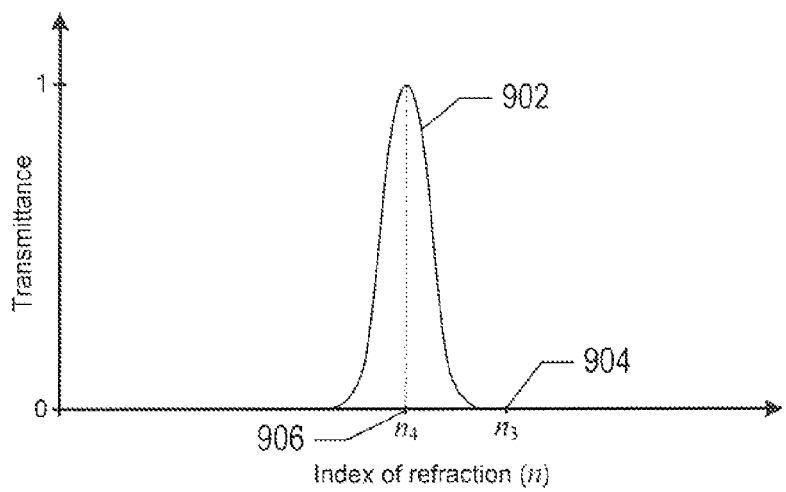
FIGS. 9A-9C show an example of a fiber-optic modulator operated to modulate a channel injected into an optical fiber.
Figure 9B:
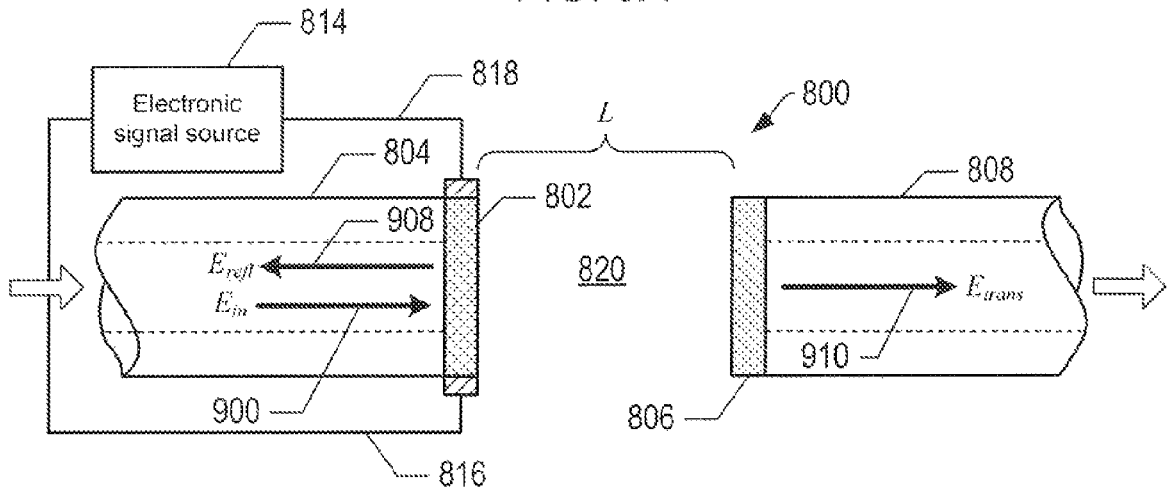
Figure 9C:
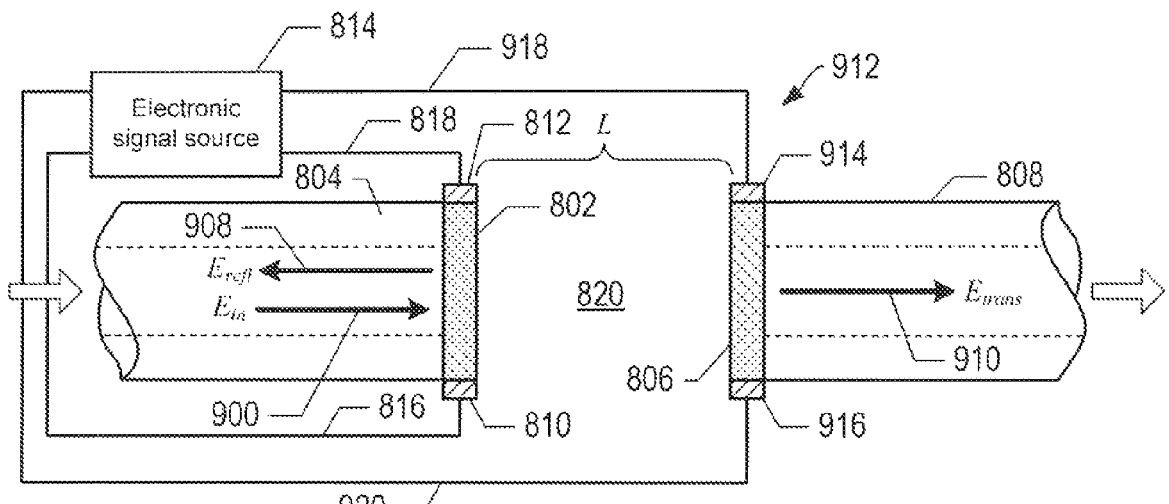

FIGS. 9A-9C show an example of the modulator 800 and the modulator 912 operated to modulate a channel 900 with irradiance $E_{in}$ injected into the optical fiber 804. The channel 900 can be generated by a semiconductor laser (not shown), such as a VCSEL or an edge-emitting laser, connected to an opposite end of the first optical fiber 804. FIG. 9A shows an example plot of a Lorentzian transmittance curve 902 associated with transmittance of the cavity 820. FIG. 9B represents operation of the modulator 800 when only the SWG 802 is used to modulate the channel 900, and FIG. 9C represents operation of a modulator 912 when the SWG 802 and the SWG 806 are both used to modulate the channel 900. As shown in example of FIG. 9C, electrodes 914 and 916 connect the SWG 806 to the electronic signal source 814 via signals lines 918 and 920, respectively.

In FIG. 9A, two effective refractive indices $n_3$ 904 and $n_4$ 906 are identified. Curve 902 reveals that when the effective refractive index of the SWG 802 has, or both the SWGs 802 and 806 have, the effective refractive index $n_3$, the cavity 820 has a transmittance of approximately "0," and when the effective refractive index of the SWG 802 has, or both SWGs 802 and 806 have, the effective refractive index $n_4$, the cavity 820 has a transmittance of approximately "1."

In FIGS. 9B-9C, $E_{in}$ 900 represents the irradiance of the channel input to the fiber 804; $E_{refl}$ 908 represents the irradiance of the channel reflected back into the fiber 804 by the cavity 820; and $E_{trans}$ 910 represents the irradiance of the channel transmitted through the cavity 820. The modulators 800 and 912 can be operated by configuring the SWGs 802 and 806 with an effective refractive index of $n_4$ when no current is applied to the SWGs 802 and 806, and the effective refractive index of the SWGs 802 and 806 changes to $n_3$ when current of an appropriate level is applied to the SWGs 802 and 806.

The modulators 800 and 912 can be operated to encode data in an optical signal as follows. In FIG. 9B, when a low or "0" current level of an electronic signal is applied to the SWG 802, or applied to both of the SWGs 802 and 806 as shown, in FIG. 9C, the SWGs 802 and 806 have an effective refractive index of $n_4$ and $E_{refl}\approx 0$ and $E_{trans}\approx E_{in}$. In other words, the channel 900 is transmitted through the cavity 820 into the optical fiber 808. On the other hand, when a high current level of an electronic signal is applied to the SWG 802, or applied to both SWGs 802 and 806 as shown in FIG. 9C, the SWG 802 is switched, or both the SWGs 802 and 806 are switched, to the effective refractive index of $n_3$ and $E_{refl}\approx E_{in}$ and $E_{trans}\approx 0$. In other words, the channel 900 is rejected by the cavity 820 and reflected back into the optical fiber 804.

In summary, the modulators 800 and 912 are operated by applying an electronic signal composed of a pattern of high and low current levels to switch the effective refractive index of one or both of the SWG 802 and 806 between refractive indices $n_4$ and $n_3$ producing a modulated optical signal composed of a pattern of optical pulses, where a high amplitude pulse corresponds to a high current level and no pulse or a low amplitude pulse corresponds to a low current level.

The strong SWGs 802 and 806 can be configured with a one- or a two-dimensional grating pattern, as described above in the preceding subsection. When the SWGs 802 and 806 are configured with a one-dimensional grating pattern, the lines of the SWGs 802 and 806 are parallel to one another and the channel 900 is TM polarized. On the other hand, when the SWGs 802 and 806 are configured with two-dimensional grating pattern, the SWGs 802 and 806 are polarization insensitive and the channel 900 can be polarized in any direction or the channel 900 can be unpolarized.

Figure 10A:
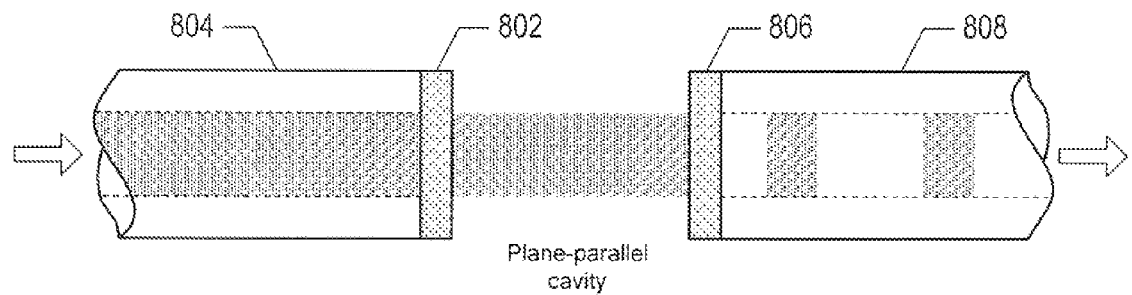
FIGS. 10A-10C show three examples resonant cavities formed from sub-wavelength gratings.
Figure 10B:
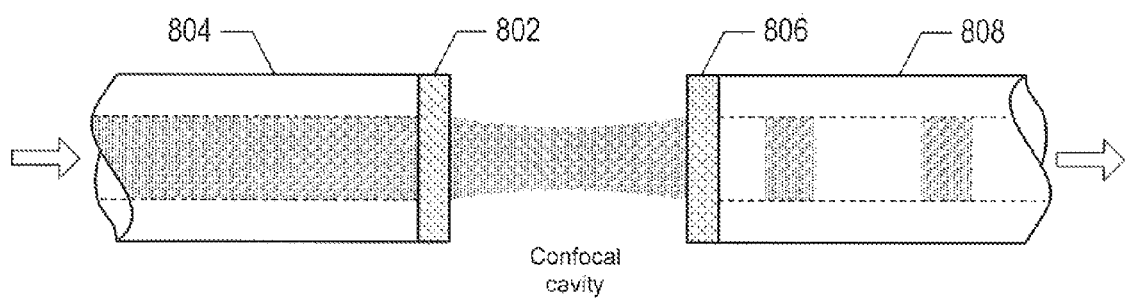
Figure 10C:
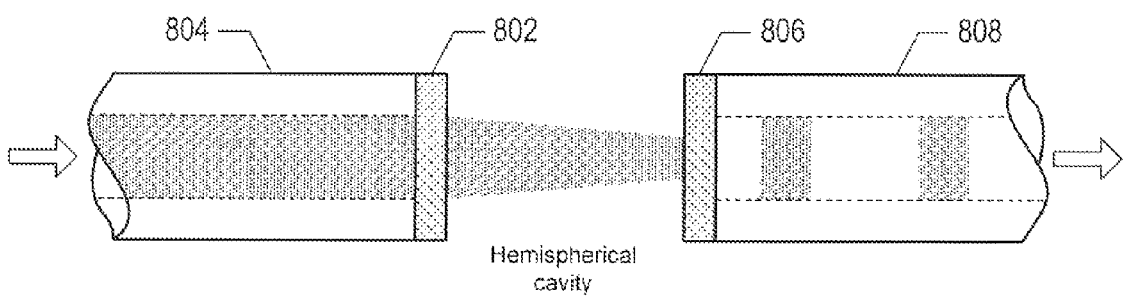

The SWGs 802 and 806 can be configured with a combination of periodic and/or non-periodic grating patterns, as described above in the preceding subsection. FIGS. 10A-10C show three examples of resonant cavities formed by configuring the SWGS 802 and 806 with appropriate grating patterns. In FIG. 10A, the SWGs 802 and 806 are both configured with periodic grating patterns to produce a plane-parallel or Fabry-Perot cavity. On the other hand, the SWGs 802 and 806 can both be configured to operate as positive curvature cylindrical or spherical mirrors to produce a confocal cavity shown in FIG. 10B. Alternatively, the SWG 802 can be configured to operate as spherical or cylindrical mirror with a positive radius of curvature, and the SWG 806 can be configured to operate as a spherical or cylindrical mirror with a negative radius of curvature to produce a hemispherical cavity shown in FIG. 10C.

Note that fiber-optic modulators 500, 800, and 912 reflect the channel to be modulated back toward the channel source. In order to prevent to the back-reflected channel from generating noise in the channel source, an inline optical isolator can be placed in the optical fiber between the channel source and the fiber-optic modulator.

The effective refractive index of a SWG can be switched between two refractive indices described above with reference to FIGS. 6A and 9A in less than approximately 1 nanosecond, enabling the modulators 500, 800 and 830 to be operated at modulation speeds in excess of 10 Gbps.

The quality factor of resonance of the SWG 502 associated with the modulator 500 and the quality factor of the cavity 820 formed by the SWGs 802 and 806 can both be approximated by $$Q \approx \frac{\Delta n}{n}$$

where n is the effective refractive index of the SWG when no current is injected, and $\Delta n$ is the change in the effective refractive indices when switching from no current injection to current injection, or vice versa. Note that for a Q of approximately 10,000, the corresponding change in the effective refractive index $\Delta n$ is approximately $10^{-4}$, which is a change in the effective refractive index that can be achieved using current injection.

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific examples are presented for purposes of illustration and description. They are not intended to be exhaustive of or to limit this disclosure to the precise forms described. Obviously, many modifications and variations are possible in view of the above teachings. The examples are shown and described in order to best explain the principles of this disclosure and practical applications, to thereby enable others skilled in the art to best utilize this disclosure and various examples with various modifications as are suited to the particular use contemplated. It is intended that the scope of this disclosure be defined by the following claims and their equivalents:

The invention claimed is:

1. A fiber-optic modulator comprising:
a first strong, sub-wavelength grating disposed on an end of a first optical fiber;
a second strong, sub-wavelength grating disposed on an end of a second optical fiber, the first and second gratings positioned approximately parallel to one another;
a first electrode disposed on an edge of the first grating and connected to an electronic signal source; and
a second electrode disposed on the edge of the first grating opposite the first electrode and connected to the electronic signal source, wherein the gratings form a resonant cavity to confine a channel input to the first optical fiber when a low or no current portion of an electronic signal to be generated by the electronic signal source is applied to the first grating and to transmit the channel when a high current portion of the electronic signal is applied to the first grating.

2. The modulator of claim 1, wherein the resonant cavity further comprise an air cavity.

3. The modulator of claim 1, wherein the resonant cavity further comprises a transparent material disposed between the first grating and the second grating.

4. The modulator of claim 1, wherein the first grating and the second grating further comprise periodic grating patterns.

5. The modulator of claim 1, wherein the first grating and the second grating further comprise non-periodic grating patterns.

6. The modulator of claim 1, wherein the first grating and the second grating further comprise a periodic grating pattern and non-periodic grating patterns.

7. The modulator of claim 1, wherein the first grating and the second grating further comprises one-dimensional grating patterns.

8. The modulator of claim 1, wherein the first grating and the second grating further comprises two-dimensional grating patterns.

9. The modulator of claim 1, wherein the first electrode is composed of a p-type semiconductor, the second electrode is composed of an n-type semiconductor, and the first grating is composed of an intrinsic semiconductor.

10. The modulator of claim 1, further comprises a transparent plate having substantially parallel first and second surfaces, wherein the first grating and the first and second electrodes are disposed on a first surface of the plate and the end of the first optical fiber is disposed on the second surface.

11. The Modulator of claim 1, wherein the resonant cavity further comprises a plane-parallel cavity.

12. The modulator of claim 1, wherein the resonant cavity further comprises a confocal cavity.

* * * * *